United States Patent [19]

Rees

[11] Patent Number: 4,783,687

[45] Date of Patent: Nov. 8, 1988

[54] SEGMENTED FILAMENT LIGHT SOURCE WITH IMPROVED ILLUMINATION OUTPUT UNIFORMITY

[75] Inventor: James D. Rees, Pittsford, N.Y.

[73] Assignee: Xerox Corporation, Stamford, Conn.

[21] Appl. No.: 885,128

[22] Filed: Jul. 14, 1986

[51] Int. Cl.⁴ .............................................. G03B 27/54
[52] U.S. Cl. .......................................... 355/67; 355/1;
362/16
[58] Field of Search ................ 355/1, 3 R, 67; 362/16

[56] References Cited

U.S. PATENT DOCUMENTS

| | | | |
|---|---|---|---|
| 3,358,475 | 12/1967 | Bockenstedt | 362/16 |
| 3,763,348 | 10/1973 | Castello | 219/347 |
| 3,947,115 | 3/1976 | Hamaguchi | 355/67 X |
| 4,194,835 | 3/1980 | Shiode | 355/67 |
| 4,300,831 | 11/1981 | Isago | 355/67 |
| 4,427,283 | 1/1984 | Gasper | 355/1 |
| 4,435,064 | 3/1984 | Tsukada et al. | 355/1 |

FOREIGN PATENT DOCUMENTS

| | | | |
|---|---|---|---|
| 55-65941 | 5/1980 | Japan | 355/67 |
| 56-78853 | 6/1981 | Japan | 355/67 |
| 58-58576 | 4/1983 | Japan | |

*Primary Examiner*—Fred L. Braun

[57] ABSTRACT

The output of a segmented filament lamp is made more uniform by placing a reflector assembly adjacent the lamp, the reflector assembly having a plurality of spherical segments formed along its length. Each spherical segment is located so as to reflect light from the filaments back to the filament plane to form a real image of each filament in interfilament space. The lamp output thus appears as a uniform and constant source. This type of filament lamp is especially useful in conjunction with an imaging system which requires a very uniform light level at a projection lens or at the surface of a document platen.

5 Claims, 5 Drawing Sheets

SEGMENTED FILAMENT LIGHT SOURCE WITH IMPROVED ILLUMINATION OUTPUT UNIFORMITY

The present invention relates to an exposure device for a document reproduction machine and, more particularly, to a linear segmented filament lamp assembly which provides an improved uniformity in illumination output.

Recently, interest has arisen in reproduction machines or copiers that, in addition to, or in lieu of, performing the usual copying function, also are capable of reading a document image and converting the image to electrical signals or pixels, which then may be stored in memory, transmitted to a remote site via a suitable data communication channel and used to control a light generating system for writing images on a photosensitive image member. One type of image writing system requires a high intensity beam of light which normally requires the use of a relatively expensive laser. This system further requires a relatively sophisticated optical system comprising, in addition to the usual lenses and mirrors, a device such as a rotating polygon to scan the light beam across the image member and a modulator such as an acousto-optical type modulator to modulate the beam in accordance with the content of the image signal or pixel input. Coupled with this is the need for complex and expensive electronic circuitry for operating the writing mechanism in timed synchronization with the reproduction machine or copier with which it is associated.

An alternate, less expensive and less complex image writing system is known in the art, which requires the use of an addressable linear optical image bar in conjunction with a linear short focal length lens array. The illumination output of the image bar is selectively controlled by input signals representing the document to be reproduced. The lens array projects the image bar output onto the photosensitive image member to form a latent image of the document, the latent image being subsequently developed and transferred to an appropriate record medium. Optical image bars fall generally into two categories; those which are self-luminous such as light-emitting diode (LED) arrays and those which are transmissive and require a light source input such as liquid crystal shutters (LCSs). According to one aspect of the present invention, there is provided an improved light source to be used with the latter type image bar.

A conventional light source presently used in conjunction with the non-luminous optical image bar is a fluorescent lamp. This type of lamp is characterized by having relatively low radiance and is only suitable for imaging systems which having imaging members and lens arrays characterized by radiometrically fast responses. As an example, gradient index lens arrays manufactured by Nippon Sheet Glass Co., Inc. under their trade name of SELFOC are available as a relatively fast lens (SLA20 SELFOC) and radiometrically slower lenses (SLA9 and SLA12 SELFOC). These lens arrays are suitable for use as an imaging device in reproduction machines but a fluorescent lamp is practical only with the SLA20 lens array. The slower SLA9 and SLA12 lenses require an illumination source with a higher radiance output. Various segmented filament lamps such as segmented halogen quartz lamps have found wide usage as the illumination device of choice for these lenses in photocopying machines. However, if the slower response lens arrays are used in conjunction with the non-self-luminous image bars, these segmented filament lamps have been found to produce gross radiance variations in the lens array direction. This problem is illustrated in FIG. 1.

FIG. 1 shows a partial front sectional view of an imaging system consisting of a segmented tungsten lamp 10, a cylindrical condensing lens 12 (which has optical power in the array direction shown), liquid crystal shutter (LCS) image bar 14, signal source 16, an SLA9 SELFOC lens array 18 comprising a plurality of gradient index optical fibers 18a, 18n and a photosensitive image member 19. It is assumed that input signals from source 16, representing document information, have altered the transmissive state of image bar 14, rendering the bar selectively transmissive. The light output from the illustrated portion of lamp 10 is shown as being emitted from filaments 10a, 10b. Each optical fiber of lens array 18 has a total field view of 18°. Fiber 18a directly beneath a filament 10a (assuming an overlying transmission portion of bar 14) will transmit a high illumination level to the member 19 surface. However, the circled area of LCS bar 14 also receives radiation from filaments 10a and 10b but this radiation arrives at high angles of incidence. Much of this radiation is outside the field of view of fibers 18d, 18e, 18f and therefore is not transmitted by these fibers. As a result, the light transmitted by fibers 18d, 18e, 18f onto the surface of member 19 is at a lower level than that transmitted by fibers 18a, 18b, 18c. This non-uniform illumination results in a document latent image having non-uniform charge patterns which, in turn result in undesirable non-uniformity in the output copy quality.

The present invention is therefore directed towards a linear illumination source with improved output uniformity and, more particularly, to an imaging system comprising, in combination, a linear, short focal length lens array, a segmented, filamented lamp, a reflector positioned adjacent said lamp, said reflector comprising a series of spherical segments, each segment positioned with respect to the filament segments of said lamp so as to focus an image of each filament into the spaces adjacent the real filaments, and an addressable image bar placed between said lamp and said array.

According to a second aspect of the present invention, a linear illumination assembly is also disclosed for use in conjunction with the illumination of a document on a platen substrate and its projection by a linear lens array onto an image plane.

Figure 2:
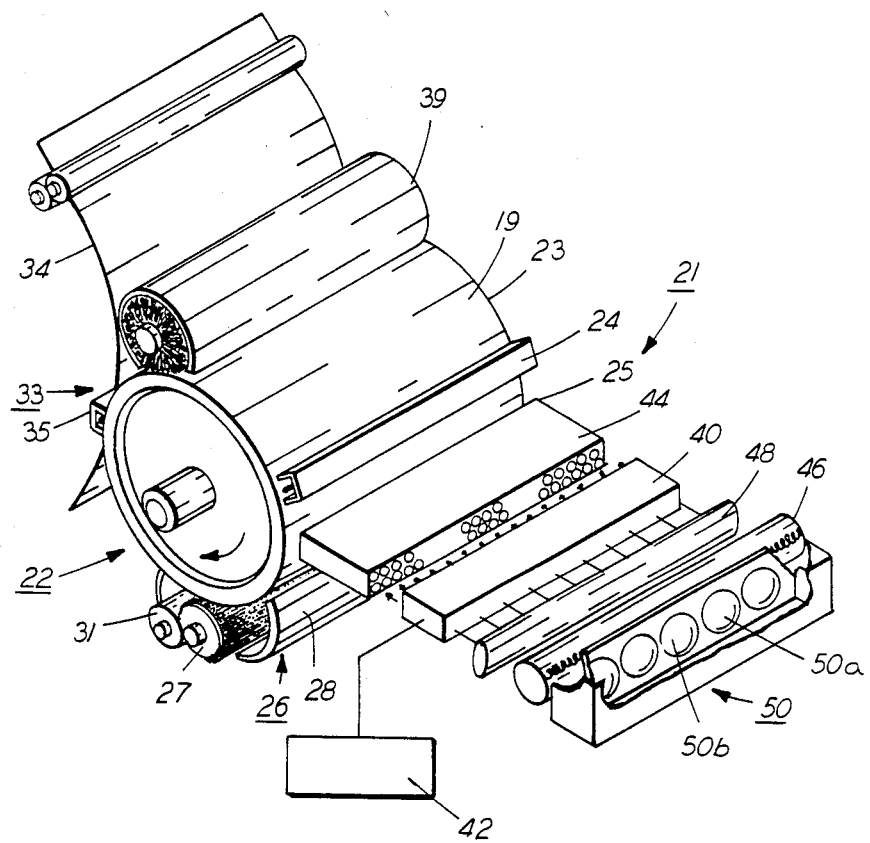
FIG. 2 shows a plane view of a document reproduction machine incorporating an optical imaging assembly utilizing a concave, spherical mirror assembly in conjunction with a segmented illumination source in a print mode of operation.

Referring to FIG. 2, the optical imaging system of the present invention, designated generally by the numeral 21, is shown in combination with a reproduction machine 22. As will appear, reproduction machine 22 is operable in a WRITE mode to expose photosensitive image member 19 thereof in accordance with an image signal input to create copies or reproductions. Reproduction machine 22 is a xerographic-based system using, as the photosensitive image member, a photoreceptor 23 in the form of a drum supported for rotation in a suitable housing or enclosure (not shown). A suitable motor (not shown) rotates drum 23 in the direction shown by the solid line arrow during operation of reproduction machine 22. A suitable corona charging device or corotron 24 is disposed in operative relationship with photoreceptor 23, corotron 24 serving to place a uniform electrostatic charge on photoreceptor drum 23 preparatory to exposure thereof.

Photoreceptor 23 is exposed at an exposure station 25 downstream of corotron 24 in a manner to be more fully described hereinbelow, such exposure creating a latent electrostatic image on the surface of photoreceptor 23. Following exposure, the latent electrostatic image on photoreceptor 23 is developed by a suitable developer 26 illustrated herein as a magnetic brush developing roll 27. Magnetic brush developing roll 27 is rotatably disposed at a suitable developer housing 28, the lower portion of which forms a sump or reservoir for a supply of developer material. A suitable developer loading device illustrated herein is a donor roll 31 which serves to draw developer from the sump and load the same onto developing roll 27, the magnetic forces generated by suitable magnets internal of developing roll 27 (not shown) serving to attract and hold at least a portion of the developer material on the exterior surface of developing roll 27. On disposition of developer material into operative relationship with photoreceptor 19, toner is attracted to the latent electrostatic image on the photoreceptor from developing roll 27 in proportion to the electrostatic forces to render the latent electrostatic image on photoreceptor 19 visible.

Following development of the latent electrostatic image, the developed image is carried by photoreceptor 23 to transfer station 33 where the developed image is transferred from photoreceptor 23 surface to a suitable copy substrate material shown here as a sheet 34 of copy paper brought forward by a suitable copy sheet feeder in timed relation to arrival of the developed image on transfer station 33. To facilitate transfer, a transfer corotron 35 is disposed opposite the photoreceptor at transfer station 33. The copy sheet 34 bearing the developed image is carried to a suitable fusing or fixing device (not shown) where the toner image is permanently adhered to the copy sheet 34. A cleaning station downstream of transfer station 33 serves to remove any leftover developing material on the photoreceptor prior to making the next image. In the exemplary copier shown, a cleaning brush 39 is provided for this purpose.

Figure 1:
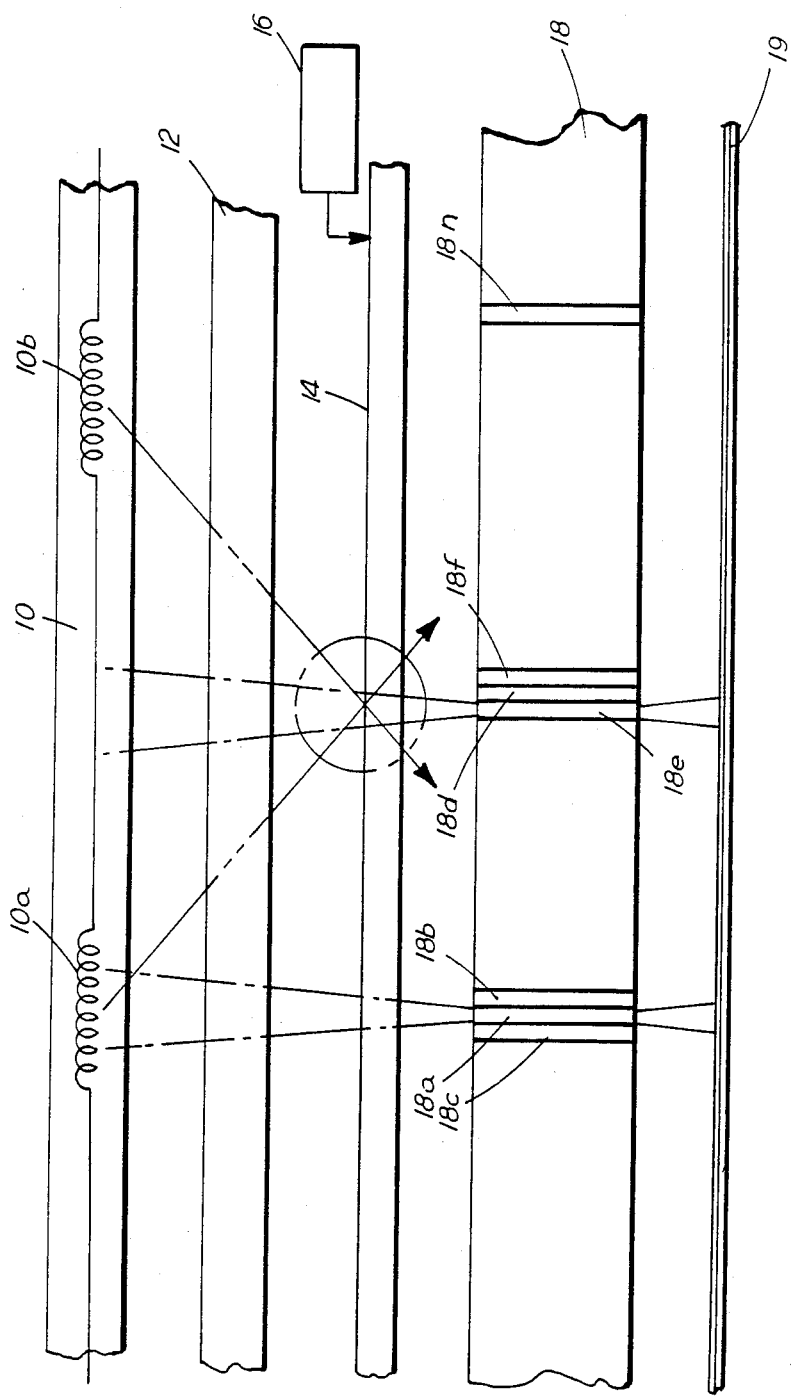
FIG. 1 shows a partial front view of an optical imaging system, utilizing a segmented filamented lamp having a non-uniform radiation output.
Figure 3:
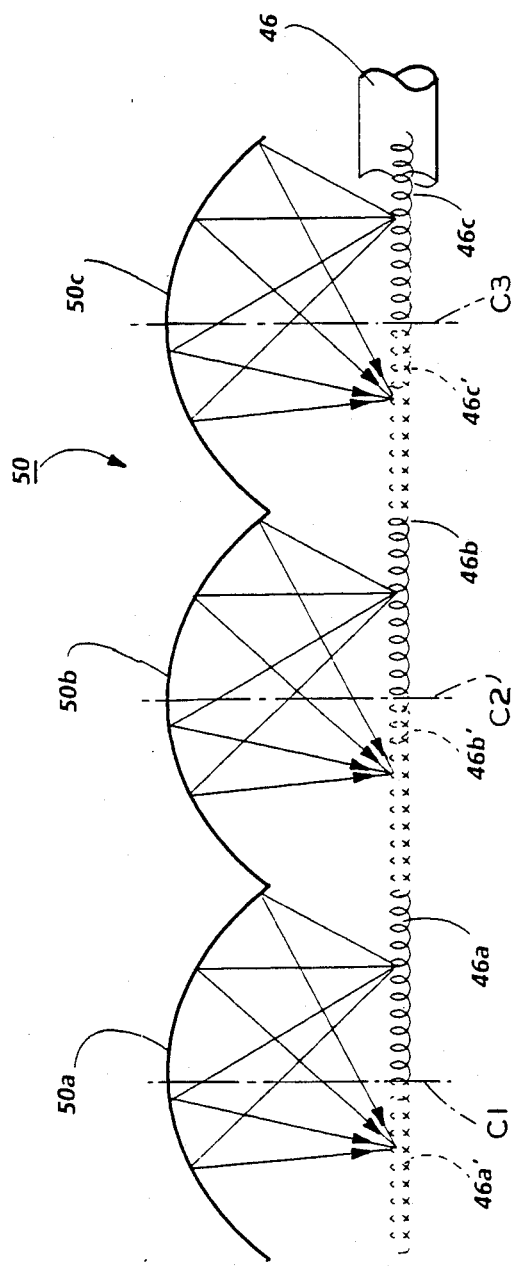
FIG. 3 shows a partial front view, enlarged, of the lamp and reflector lamp and reflector assembly of FIG. 2.

Turning now to the optical imaging system 21, the system comprises an elongated generally rectangular optical image bar 40 which, in the preferred embodiment, is a liquid crystal shutter. Preferably, the width of bar 40 in a cross scan direction is substantially equal to the effective width of photoreceptor 23. The light transmissive state of bar 40 is controlled by input signals representing document information from signal source 42. A linear gradient index lens array 44 is disposed in predetermined spaced relationship between the surface of photoreceptor 23 and the output face of image bar 40. In a preferred embodiment, lens array 44 is an SLA9, SELFOC lens, the term SELFOC being a Registered Trademark owned by Nippon Sheet Glass Co., Ltd.. The light input to the entire face of image bar 40 is provided by a segmented filament lamp 46. The light output from lamp 46 is preferentially directed into image bar 40 by cylindrical condensing lens 48. The light output from lamp 46 is rendered uniform by placing an elongated concave spherical array reflector 50 in a position adjacent to lamp 46 such that real images of the filaments are produced at unit magnifications in the spaces between the filaments. This property of reflector 50 is shown more clearly with reference to FIG. 3. FIG. 3 shows a top view of a portion of lamp 46 and reflector 50. Reflector 50 is seen to consist of a series of concave spherical mirrors 50a, 50b, etc.. Lamp 46, for this embodiment, consists of a plurality of filament 46a, 46b, etc., having a filament spacing equal to the filament length. The centers of curvature C1, C2, for each mirror 50a, 50b is coincident with the ends of each filament 46a, 46b. As shown by the light rays reflected from mirror 50b, a real adjacent image 46b'. (shown dotted) of filament 46b is formed in the same plane as filament 46b. Likewise, a real image 46a' is formed adjacent filaments 46a. Each mirror thus forms a real filament image in each filament space, making the segmented lamp appear to image bar 40 as a continuous filament lamp. The light entering lens array 44 (FIG. 1) is thus not subject to the radiance variation described in connection with the FIG. 1 prior art embodiment and the exposure at the photoreceptor 23 surface is at a uniform level.

Figure 4:
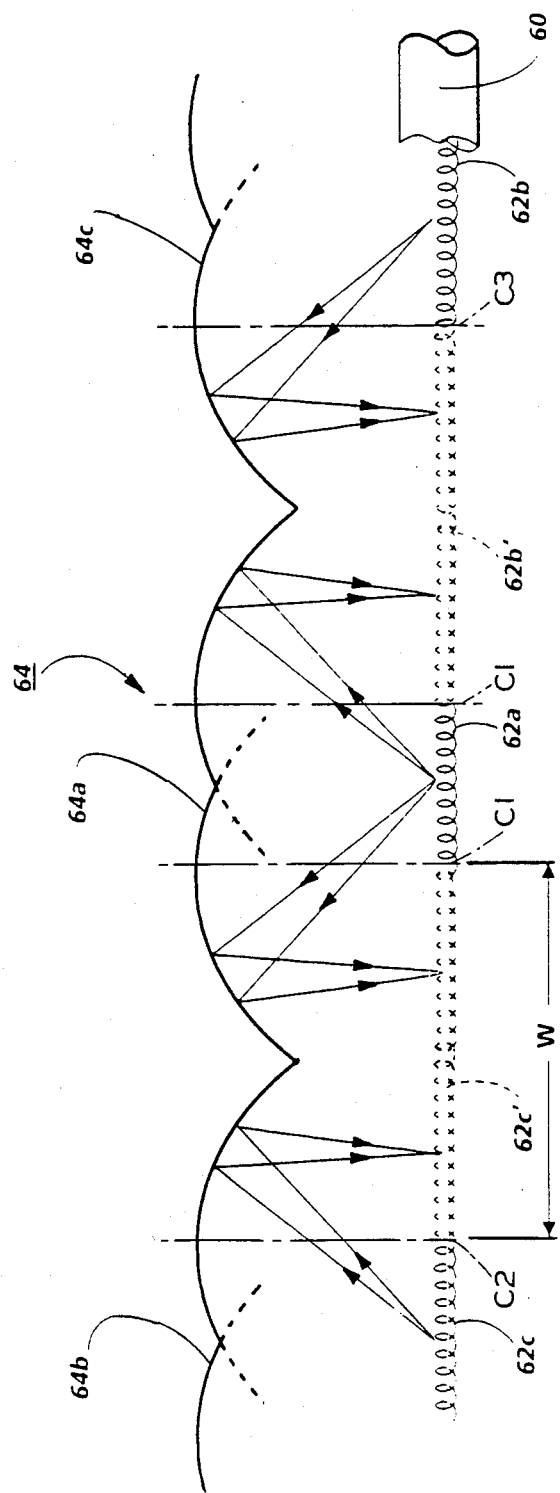
FIG. 4 shows a second embodiment of the concave, spherical mirror assembly where the filament spacing of the lamp is twice the filament length.

Many commercial tungsten segmented arrays, of lower total power than lamp 46 in FIG. 3 have a filament spacing greater than the filament length as is shown in FIG. 4 wherein lamp 60 has a filament spacing W which is twice the length of the individual filaments 62a, 62b, 62c. Reflector array 64 consists of partially spherical reflectors 64a, 64b, 64c etc., centrally overlying each real filament and positioned at a distance such that filament images 62a', 62b' are formed by reflections from portions of two different filaments. For this embodiment, the centers of curvature, C1, C2, C3, etc. lie on both ends of the filaments (in FIG. 3, the centers were only on one end).

Figure 5:
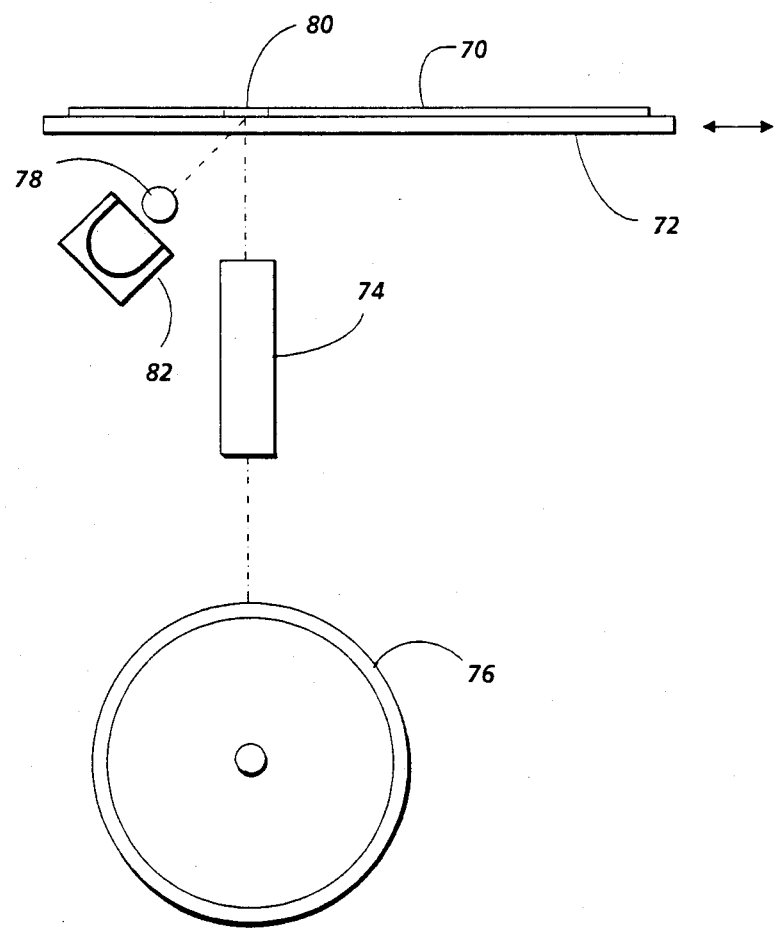
FIG. 5 shows the side view of a document reproduction machine incorporating the illumination lamp assembly of the present invention in a copy mode of operation.

While the imaging assembly has been described above as useful in a print mode, the illumination lamp assembly of the present invention may also be used as the illumination source in a copy mode of operation. FIG. 5 illustrates a copying machine wherein a document 70 to be copied is placed on transport platen 72. A SELFOC TM lens array 74 is placed between the platen and a photoreceptor drum 76. A segmented tungsten lamp 78 is positioned beneath the platen with its light output preferentially directed so as to illuminate an incremental scan strip on the platen. Platen 72 is adopted to move horizontally in a scanning cycle carrying the entire document past the illuminated scan strip 80. Incremental images are reflected downward into the entrance face of array 74 and projected onto the surface of drum 76, forming a latent image of the document thereon. In order to ensure a uniform illumination level at the scan strip, lamp 78 has an associated reflector 82 which can be, for example, the array discussed in connection with the FIGS. 2, 3 and 4 embodiments.

While the invention has been described with reference to the structure disclosed, it is not confined to the details set forth, but is intended to cover such modifications or changes as may come within the scope of the following claims. For example, other types of linear lens arrays such as strip lenses may be used instead of the SELFOC ™. The FIG. 5 embodiment may also be used in printing environments wherein a document is scanned and focused onto a photosensing array to be converted into an electronic image.

What is claimed is:

1. An imaging system comprising, in combination a linear, short focal length lens array, a segmented filament lamp, a linear positioned adjacent said lamp, said reflector comprising a series of spherical segments arranged along the length of the reflector, each segment positioned with respect to the filament segments of said lamp so as to focus an image of each filament segment into the spaces adjacent the filament segments, and an addressable image bar placed between said lamp and said array.

2. The imaging system of claim 1 wherein at least one end of the filament segments are positioned in the center of curvature of an associated spherical segment.

3. The imaging system of claim 1 wherein the distance between the filament segments of said lamp is equal to approximately twice the filament segment length and whereas both ends of the filament segments are positioned in the center of curvature of the associated spherical segment.

4. In a document printing machine wherein a latent image is formed on a photosensitive surface by a light pattern projected by a document imaging system, the improvement wherein the imaging system comprises, in combination, a linear, short focal length lens array, a segmented, filament lamp, a linear reflector positioned adjacent said lamp, said reflector comprising a series of curved segments arranged along the length of the reflector, each segment positioned with respect to the filament segments of said lamp so as to focus an image of each filament segment into the spaces adjacent the filament segments, and an addressable image bar placed between said lamp and said array.

5. A document illumination system for illuminating a document lying in an object plane, the system comprising a linear segmented filament lamp positioned beneath said object plane and a linear reflector positioned adjacent said lamp, said reflector comprising a series of curved segments, each segment positioned, with respect to the lamp filament segments arranged along the length of the reflector so as to focus an image of each filament segment into the spaces between the filament segments.

* * * * *